(12) United States Patent
Werner et al.

(10) Patent No.: US 9,573,415 B2
(45) Date of Patent: Feb. 21, 2017

(54) TWO-PART WHEEL

(71) Applicant: THYSSENKRUPP CARBON COMPONENTS GMBH, Kesselsdorf (DE)

(72) Inventors: Jens Werner, Coswig (DE); Christian Köhler, Dresden (DE); André Bartsch, Dresden (DE); Sandro Mäke, Dohma (DE); Michael Dreβler, Dresden (DE); Martin Lepper, Dresden (DE); Werner Hufenbach, Dresden (DE)

(73) Assignee: THYSSENKRUPP CARBON COMPONENTS GMBH, Kesselsdorf (DE)

( * ) Notice: Subject to any disclaimer, the term of this patent is extended or adjusted under 35 U.S.C. 154(b) by 63 days.

(21) Appl. No.: 14/363,072

(22) PCT Filed: Dec. 3, 2012

(86) PCT No.: PCT/EP2012/074186
§ 371 (c)(1),
(2) Date: Jun. 5, 2014

(87) PCT Pub. No.: WO2013/083501
PCT Pub. Date: Jun. 13, 2013

(65) Prior Publication Data
US 2015/0076896 A1    Mar. 19, 2015

(30) Foreign Application Priority Data

Dec. 7, 2011    (DE) .................. 10 2011 087 923

(51) Int. Cl.
*B60B 3/14* (2006.01)
*B60B 3/00* (2006.01)
(Continued)

(52) U.S. Cl.
CPC ................ *B60B 3/14* (2013.01); *B60B 3/002* (2013.01); *B60B 3/08* (2013.01); *B60B 3/087* (2013.01);
(Continued)

(58) Field of Classification Search
CPC .... B60B 3/14; B60B 3/10; B60B 3/08; B60B 3/087; B60B 3/142; B60B 3/002
(Continued)

(56) References Cited

U.S. PATENT DOCUMENTS 3,410,605 A * 11/1968 Mayrath .............. B23K 11/093
301/64.201
D264,835 S * 6/1982 Reid ............................ D12/211
(Continued)

FOREIGN PATENT DOCUMENTS

CN      1223613 A    7/1999
CN    101402301 A    4/2009
(Continued)

OTHER PUBLICATIONS

Chinese Office Action of Nov. 11, 2015.

*Primary Examiner* — S. Joseph Morano
*Assistant Examiner* — Jean Charleston
(74) *Attorney, Agent, or Firm* — McGlew and Tuttle, P.C.

(57) ABSTRACT

While specific embodiments of the invention have been shown and described in detail to illustrate the application of the principles of the invention, it will be understood that the invention may be embodied otherwise without departing from such principles.

14 Claims, 6 Drawing Sheets

(51) Int. Cl.
*B60B 3/08* (2006.01)
*B60B 3/10* (2006.01)
*B60B 25/00* (2006.01)

(52) U.S. Cl.
CPC ............... *B60B 3/10* (2013.01); *B60B 3/142* (2013.01); *B60B 25/002* (2013.01); *B60B 2310/302* (2013.01); *B60B 2310/316* (2013.01); *B60B 2310/318* (2013.01); *B60B 2900/111* (2013.01); *B60B 2900/311* (2013.01); *B60B 2900/521* (2013.01); *B60Y 2200/10* (2013.01)

(58) Field of Classification Search
USPC .................................................. 301/10.1, 64
See application file for complete search history.

(56) References Cited

U.S. PATENT DOCUMENTS

| | | | | |
|---|---|---|---|---|
| 4,363,347 A * | 12/1982 | Baumgartner | ............ | B60B 3/02 152/411 |
| 4,989,657 A * | 2/1991 | Lipper | .................... | B60B 25/20 152/396 |
| 5,275,471 A * | 1/1994 | Nutzmann | .............. | B60B 23/10 301/10.1 |
| 5,933,956 A | 8/1999 | Boenning et al. | | |
| 6,598,939 B2 * | 7/2003 | Muller | .................... | B60B 3/002 301/10.1 |
| 6,726,292 B1 | 4/2004 | Schroeder et al. | | |
| 7,073,871 B2 * | 7/2006 | Hamada | .................. | B60B 3/002 152/396 |
| 7,083,238 B2 * | 8/2006 | Clements | ................ | B60B 23/10 152/396 |
| 7,530,644 B2 * | 5/2009 | Hodges | ..................... | B60B 1/08 301/37.101 |
| 2004/0255462 A1 * | 12/2004 | Schroeder | ................. | B60B 1/06 29/894.35 |

FOREIGN PATENT DOCUMENTS

| | | | |
|---|---|---|---|
| DE | 14 80 788 A1 | | 9/1969 |
| DE | 1480788 A | * | 9/1969 |
| DE | 72 00 847 U | | 5/1972 |
| DE | 74 16 695 U | | 8/1974 |
| DE | 85 26 012 U1 | | 10/1985 |
| DE | 93 02 974 U1 | | 9/1993 |
| DE | 196 01 788 C1 | | 7/1997 |
| DE | 195 34 522 C2 | | 12/1997 |
| DE | 197 15 072 A1 | | 10/1998 |
| DE | 198 07 943 A1 | | 9/1999 |
| GB | 2052 298 A | * | 9/1979 |
| WO | 97/13647 A1 | | 4/1997 |
| WO | WO 9749565 A | * | 4/1997 |
| WO | 97/49565 A1 | | 12/1997 |

* cited by examiner

TWO-PART WHEEL

CROSS REFERENCE TO RELATED APPLICATIONS

This application is a U.S. National Phase Application of International Application PCT/EP2012/074186 filed Dec. 3, 2012 and claims the benefit of priority under 35 U.S.C. §119 of German Patent Application DE 10 2011 087 923.4 filed Dec. 7, 2011, the entire contents of which are incorporated herein by reference.

FIELD OF THE INVENTION

The present invention pertains to a two-part wheel for vehicles, especially automobiles, wherein the two wheel parts are connected with one another in a positive-locking manner and/or by connection in substance.

BACKGROUND OF THE INVENTION

A wheel usually has a rim ring with a rim well, which is defined by an inner wheel flange and an outer wheel flange. The inner wheel flange and the outer wheel flange circumferentially enclose the tire, guide same and seal it airtightly by the tire walls being sealingly supported on the wheel flanges based on the internal pressure in the tire. A wheel spider or a rim disk, which establishes the connection with the axle, is arranged as a carrier element for the rim in the interior of the rim.

Many two-part wheel solutions for the manufacture of automobiles are known from the state of the art. Such two-part wheels are used especially for trucks in order to facilitate tire change. The wheels are designed for this such that the two wheel parts are detachable from each other. Each of the two wheel flanges is arranged on a different part of the two-part wheel.

Another reason for designing wheels as two-part wheels lies in the aesthetic requirements imposed on these. Thus, it is occasionally desirable to have the possibility of replacing the wheel spider with a wheel spider of a different design. Such an object is accomplished, for example, by DE 8526012U1, which proposes a rim ring with rim well as well as a wheel spider arranged detachably on this. The wheel spider is fastened to the rim ring by the spider ends extending behind corresponding counterpieces on the rim ring in the manner of a bayonet catch and are fixed under these with bolts. Another embodiment describes that the wheel may be a two-part wheel, wherein each part has a wheel flange and wherein the two parts of the wheel are connected by said bayonet catch-like coupling.

The solution according to U.S. Pat. No. 6,726,292 B1, in which two wheel parts made of fiber composite, each of which has a wheel flange and a part of the wheel spider, mesh with one another with ideal (complementary) shape on the sides facing one another, serves the purpose of reducing the weight. A number of recesses on the inner wheel part is located opposite an ideally shaped number of teeth on the outer wheel part. The five spokes of the wheel spider have a rectangular cross section and are hollow and are formed by the base, which is provided by the inner wheel part, and a trilateral counterpiece, which is provided by the outer wheel part. The two wheel parts are held together by bolt connections, as well as by the wheel retaining nuts, which hold both wheel parts.

WO 1997/13647 A1 describes a two-part wheel, in which each wheel part likewise has a wheel flange and a part of the wheel spider, for an especially cost-effective vehicle design. The two wheel parts have contact surfaces facing each other, which have ideally shaped elevations and depressions meshing with one another. The two wheel parts are held together by click and bonded connection as well as by rivets. Moreover, the lug nuts also hold the two parts together in the mounted state. The wheel is preferably made of fiber-reinforced plastic and is said to be especially lightweight. The two wheel parts are bonded to one another over the entire surface in the mounted state. The rim well is formed by a projecting edge of the inner wheel part, which meshes with a corresponding groove of the outer wheel part due to click connection.

Wheels are subject to different, high stresses. These stresses occur to a lesser extent during the simple acceleration or braking operations or during the typical rolling operation and they rather occur when the wheels meet obstacles. This is especially critical when the wheels are not stressed indirectly via the tires but are stressed directly laterally. Such stresses occur, e.g., when hitting curbstones. The prior-art wheel designs can respond to these stresses only poorly. Furthermore, it is problematic to design the complex shape of an automobile wheel in a cost-effective and effective manner.

SUMMARY OF THE INVENTION

An object is therefore to provide a two-part wheel design, which responds very well to lateral stresses and can be manufactured easily and in a cost-effective manner.

The object is accomplished according to the present invention with a wheel that has two wheel parts, wherein each wheel part contains a circumferential wheel flange and a part of the wheel spider (wheel spoke region/wheel center region/wheel star region) and wherein the wheel spider is designed such that recesses of the wheel spider parts of the two wheel parts are surrounded by borders, and wherein at least one border of a wheel spider circumferentially and flatly surrounds a border of the other wheel spider meshing with it with an ideal shape (complementary shape) or is surrounded by said border, and the borders that touch each other are connected with one another. There are preferably at least two and more preferably at least three recesses, which are surrounded by borders and which fit with ideal shape the borders of the other wheel spider part or are surrounded by these with ideal shape.

A border is defined here as a projection, which circumferentially fully surrounds a recess in the wheel spider. The wheel spider may have a plurality of recesses, some or all of which are surrounded by borders. The borders of the recesses of a wheel spider may be formed on one side or on both sides of the wheel spider. The height of the border over the plane of the material of the wheel spider is preferably constant. However, it may also vary, e.g., in a wave-shaped manner. The material thickness of the border is preferably constant, but it may vary, for example, in the form of reinforcing ribs. The cross section of the borders preferably corresponds to the shape of the recess and is constant over the entire height. However, a preferred embodiment also makes provisions for border cross sections increasing or decreasing conically starting from the wheel spider. Borders whose diameter (dimensions) decreases are advantageously inserted here during the assembly of the two wheel parts into borders whose diameter increases, and the borders fit into one another with ideal shape. Such borders fitting into one another conically with ideal shape guarantee especially good guiding and centering of the borders in one another.

The borders advantageously have an optional curvature area at the transition from the wheel spider into the border.

The wheel design according to the present invention has two wheel parts with a circumferential wheel flange and a wheel spider as well as axle opening and/or bolt holes for fastening, wherein the two wheel spiders of the wheel parts together form the wheel spider of the wheel in the assembled state of the wheel.

The wheel spiders have recesses. The wheel spider is made by these recesses to appear to have spokes. There are preferably three to twelve, especially preferably three to eight and more preferably three to six spokes, with at least one recess being present between two spokes. More than one recess is arranged between two spokes in a preferred embodiment. Two or three and more preferably up to five recesses are possible between two spokes.

The shape of the recesses may be different; thus, a kidney shape, in which the lower edge and the upper edge extend in parallel to the axle opening and the lower edge and the upper edge are connected at their ends by circular arc sections, is preferred in a wheel spider that has only three recesses. This kidney shape is advantageously also used in case of a greater number of recesses. A circular shape of the recesses is preferred as well. Other preferred embodiments are recesses of a polygonal (triangular, tetragonal, pentagonal, hexagonal, etc.) shape, where it is especially advantageous to round the corners of the polygons in order to achieve the most uniform distribution of the forces possible in the borders.

The wheel part, which is not visible in the operating state of a four-wheel vehicle, is called the inner wheel part, and the wheel part that is visible in the operating state is called the outer wheel part. The two wheel parts are connected with one another in a positive-locking manner and/or by connection in substance.

The wheel parts are preferably connected by the borders around the recesses of the wheel spiders of the wheel parts by inserting one into the other and being connected in a positive-locking manner and/or by connection in substance.

The inner wheel part preferably has borders around some or preferably around all recesses on its side facing away from the vehicle. The outer wheel part likewise has a border on its side facing the vehicle at the recesses, which correspond to the bordered recesses of the inner wheel part. The borders are designed such that the border of one wheel part mesh with complementary (ideal) shape with the borders of the other wheel part. The borders of the outer wheel part preferably fit into the borders of the inner wheel part in a positive-locking manner. It is, however, also possible that the borders of the inner wheel part are positioned within the borders of the outer wheel part. An alternating arrangement is, of course, possible as well. A distance is left in this embodiment between the rim well parts of the wheel parts, because the borders act as spacers. The distance between the rim well parts of the two wheel parts makes it advantageously possible to cushion lateral shocks especially well, because the elastic properties of the outer wheel part can be especially effective, because a simultaneous deformation of the inner wheel part is extensively avoided.

Provisions are made in another preferred embodiment for the borders of the recesses of the inner wheel part to be directed inwardly and for the borders of the outer wheel part to mesh with these with ideal shape. No distance is advantageously left in this manner between the rim well parts of the wheel parts. The connection can therefore take place not only along the borders, but preferably also over the entire surface along the two wheel spider parts.

The borders of the recesses of the outer wheel part are directed outwardly and the borders of the inner wheel part mesh with these with ideal shape in another preferred embodiment. Space is advantageously left in this manner to make it possible to arrange the brake system (brake disk and brake blocks).

The wheel parts may consist of the same material or different materials. The materials used for the wheel parts are preferably the same materials that are used for conventional wheels according to the state of the art. These are preferably light metals (Al, Mg) or light metal alloys, steel, composites, especially fiber composites, such as carbon fiber-, glass fiber- or Kevlar-reinforced plastics.

The borders of the recesses of the wheel parts or even of the wheel spiders of the wheel parts, if these touch each other, are connected depending on the materials of the wheel parts. Full-surface bonding of the borders of the two wheel parts on the entire contact surface of the borders is especially preferred. Welding or positive-locking connection by pressing one or more contact points of the borders is preferred as well. If the wheel is intended for use with tubeless tires, it is essential that the borders be connected airtightly. Some or all contact lines of the borders with the adjacent wheel part are treated with a sealant (for example, a silicone-based sealant) in a preferred embodiment.

The wheel spider parts of the wheel parts are preferably provided with an axle hole, through which the axle of the vehicle extends. The axle opening or axle hole is surrounded in both wheel parts, just like the recesses, by a border. The fastening of the wheel is designed as an axle fastening in an especially preferred embodiment. A back-up ring, which surrounds the borders at equal overall height with an ideal shape and thus absorbs part of the force that is exerted when the fastening bolt of the wheel is tightened, is used in a preferred variant of this embodiment.

Provisions are made in another preferred embodiment for the wheel to also have bolt holes for fastening next to the central axle opening. These bolt holes are distributed radially around the axle opening and are used to fasten the wheel to the standardized brake disks or brake drums. Like the recesses, the bolt holes are preferably designed to connect the two wheel parts and have borders, which are located one inside the other, with the inner border corresponding to the bolt diameter of the bolt. Provisions are made in another preferred embodiment for each bolt hole to be surrounded with a back-up ring, which absorbs part of the force that is exerted when the bolts are being tightened. An even more preferred embodiment provides for a ring, which surrounds the axle opening and has a corresponding opening for each bolt hole. This back-up ring absorbs part of the force that is exerted on the wheel parts when the lug nuts and bolts are tightened.

The materials that can be used for the said back-up rings are preferably the same materials that are used for the wheel parts. However, it is also possible to use other materials, which can absorb the forces that occur. For example, metallic back-up rings may also be used between wheel parts made of fiber composite.

The borders around the recesses of the wheel spider parts have a height of 0.5 cm to 4 cm in case of typical passenger car wheels with a diameter of 15" to 17". The border height actually used depends on the load to be expected and is greater, for example, in case of wheels for sport utility vehicles than in case of passenger cars for exclusive use on roads. The border height may also be greater in case of larger wheel diameters. The necessary border height depends, furthermore, on the number of recesses. On the whole, the border height and the material thickness of the border, as well as the entire design of the wall thickness, etc., are the subject of usual engineering design, for example, with the use of finite-element methods. The borders preferably consist of the same material as the wheel part from which they project. The borders are preferably manufactured together with the wheel part to which they belong.

The wheel according to the present invention advantageously has a better resistance to stresses in the lateral direction. Since the two wheel parts are not connected over the entire surface, the elasticity of the outer wheel part can be utilized better. Provisions are therefore made in a preferred embodiment for the inner wheel part to consist of a relatively rigid material, while the outer one possesses especially good elastic properties. The manufacture of the wheel according to the present invention is also improved, because the two wheel parts can be manufactured one by one and the complicated shape of the entire wheel can thus be broken down into two easier-to-manufacture individual shapes.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings in particular, the present invention will be explained on the basis of the following exemplary embodiment.

Figure 1:
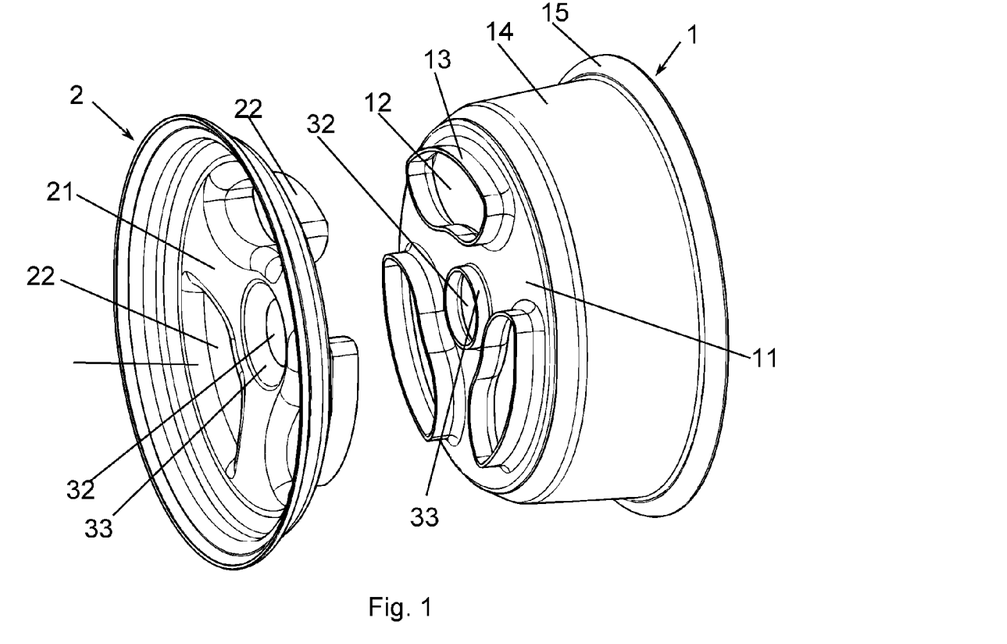
FIG. 1 is an exploded front perspective view of an inner wheel part and an outer wheel part according to the invention.
Figure 2:
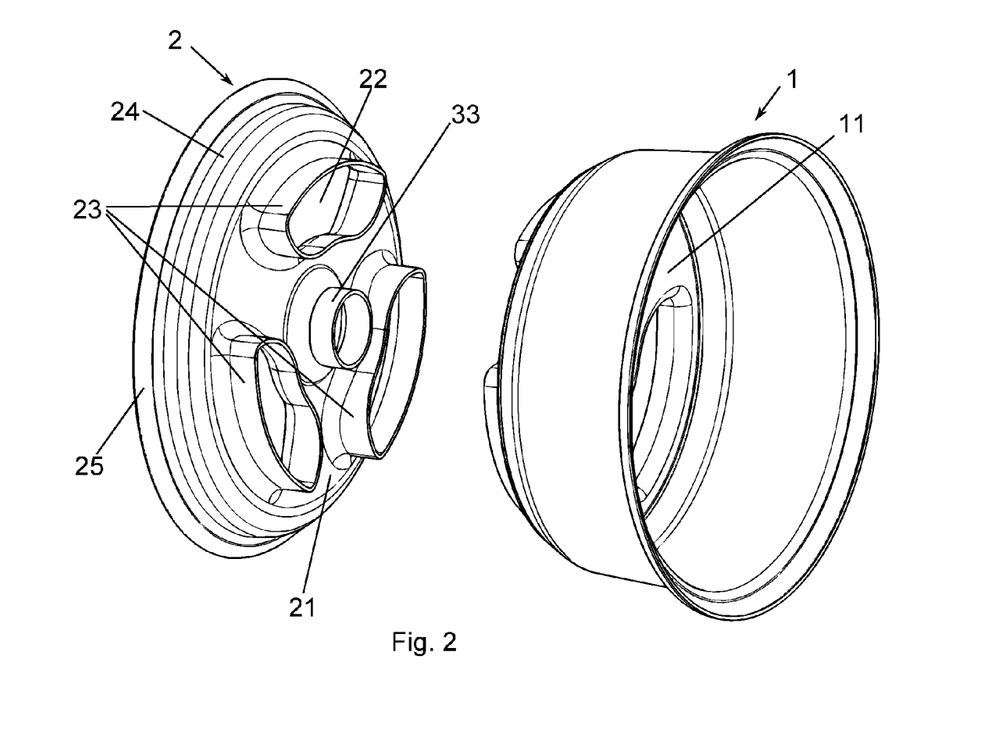
FIG. 2 is an exploded rear perspective view of an inner wheel part and an outer wheel part according to the invention.

FIG. 1 and FIG. 2 show the inner wheel part (1) and the outer wheel part (2) from two different viewing angles. Each wheel part (1, 2) has a rim well part (14, 24), a wheel flange (15, 25), and a wheel spider (11, 21). The wheel spiders (11, 21) have three recesses (12, 22) each, which are surrounded by borders (13, 23). The axle opening (32) with the corresponding border (33) is shown in the center of each wheel part (1, 2). The wheel parts being shown here are manufactured from deep-drawn steel DD11. The wheel parts form together a 15" wheel (6). The material thickness in the area of the rim well equals 2 mm. The wheel flanges have a material thickness of 4 mm, while the material thickness of the wheel spider and of the respective corresponding border is 4.5 mm.

Figure 3:
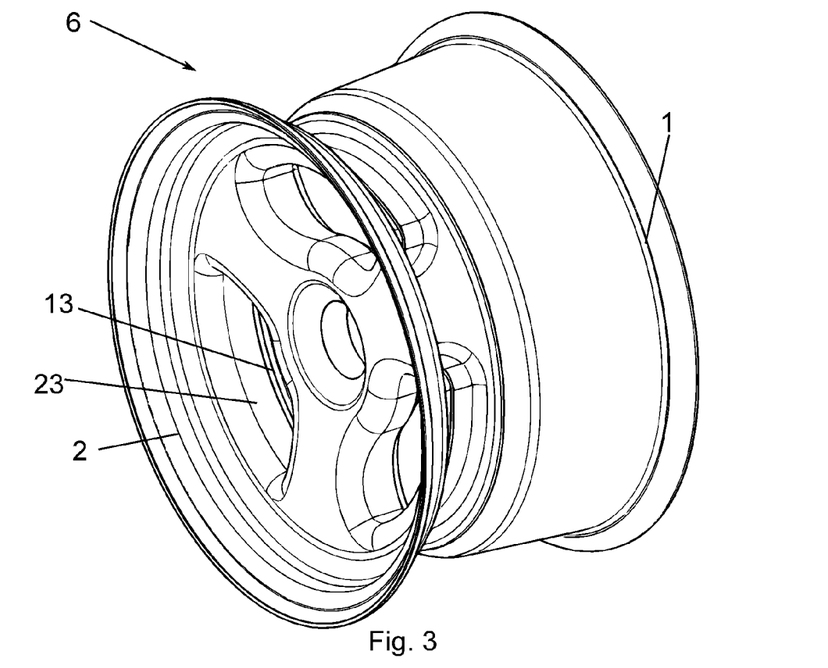
FIG. 3 is a front perspective view of the wheel according to the invention.
Figure 4:
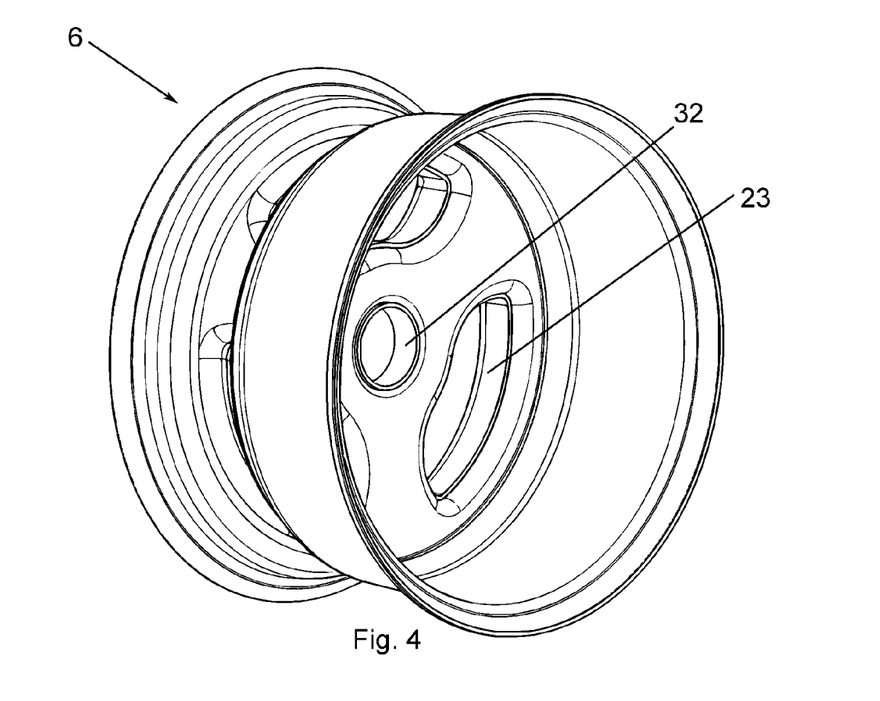
FIG. 4 is a front perspective view of the wheel according to the invention.

FIG. 3 and FIG. 4 show a fully assembled wheel (6) from different viewing angles. The inner wheel part (2) and the outer wheel part (1) are connected to one another by the border (23) of the outer wheel part (2) meshing with ideal shape with the border (13) of the inner wheel part (1). The border (23) of the outer wheel part hides the border (13) of the inner wheel part in FIG. 4. The two wheel parts (1, 2) are fixed by means of adhesive.

Figure 5:
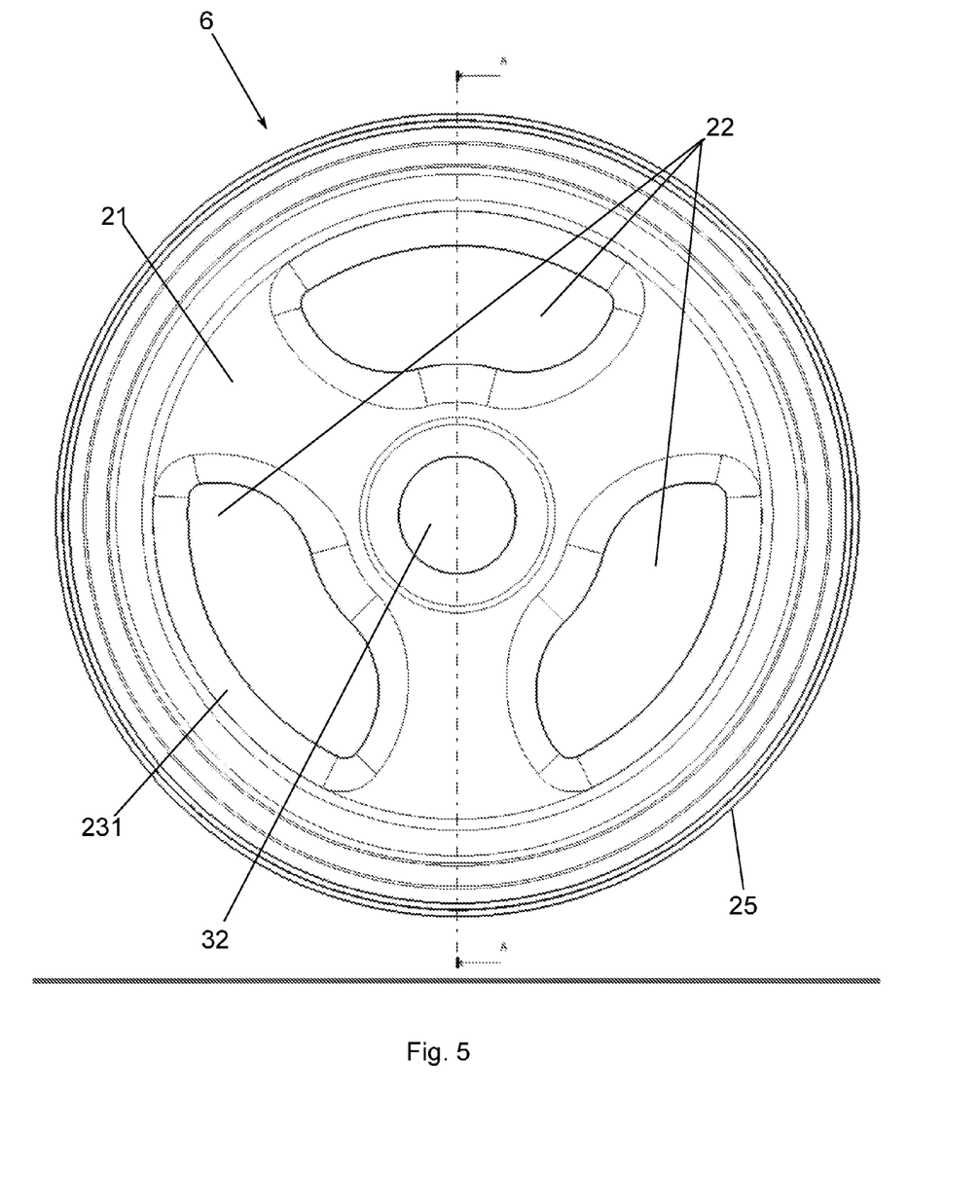
FIG. 5 is a front view of the wheel according to the invention.

FIG. 5 shows the view of the wheel (6) as can be seen in the operating state of the vehicle. Only the outer wheel part (2) with the recesses (22) in the wheel spider (21) is visible. Especially the curvature areas (231), which lead from the rim well into the borders, can be recognized here.

Figure 6:
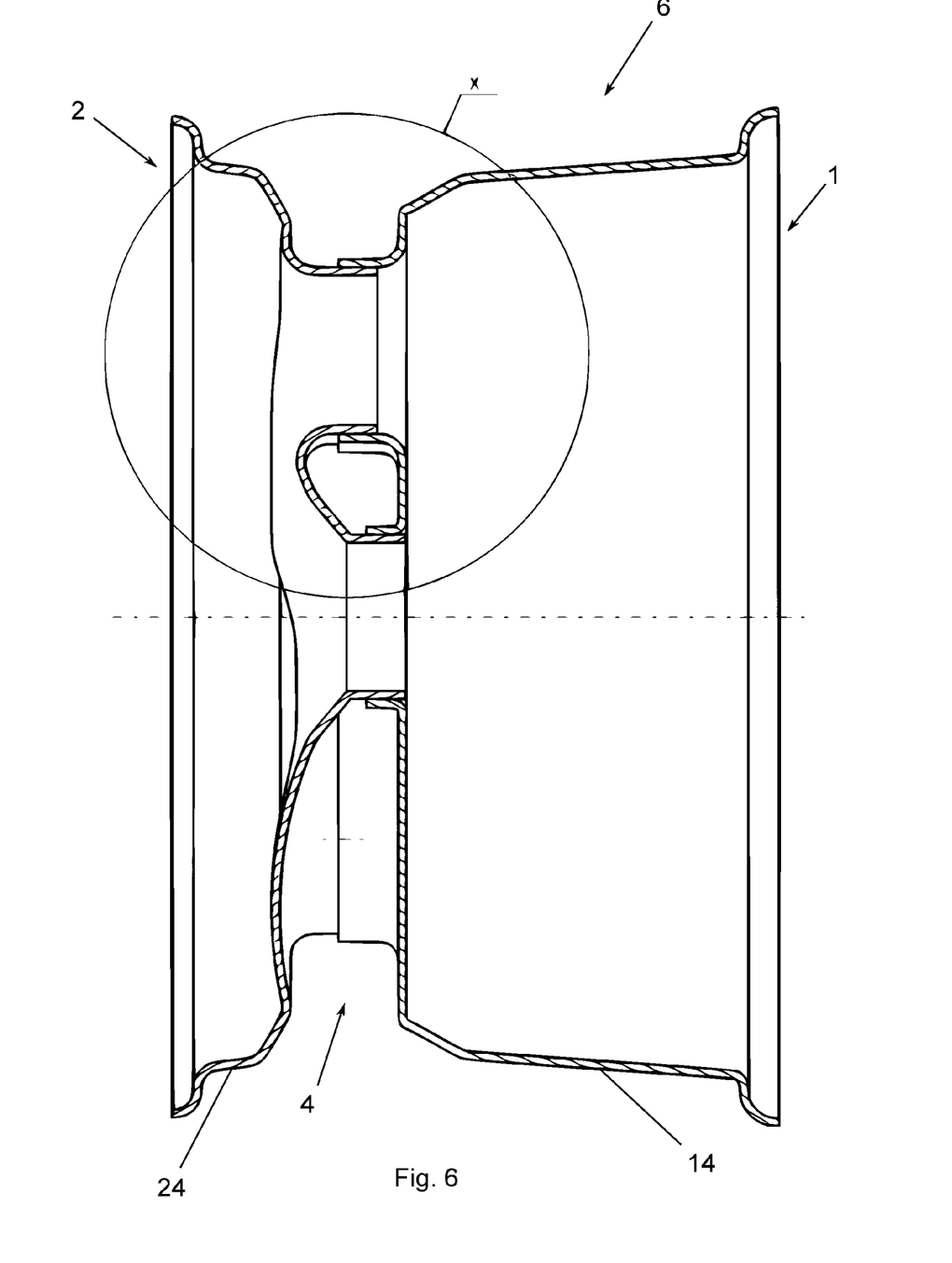
FIG. 6 is a cross sectional view of the wheel according to the invention.

FIG. 6 shows a section through the wheel (6) according to FIG. 5 along axis A-A. As can be recognized, the wheel parts (1, 2) have rim well parts (14, 24) of different sizes. Due to the fact that the inner wheel part (1) has a broader rim well part (14), sufficient space is left in the interior of the wheel part for the brake device of the wheel. As can be recognized, there is a distance (4) between the inner rim well part (14) and the outer rim well part (24). Since the wheel (6) shall be used with tubeless tire, airtight connection of all borders is necessary.

Figure 7:
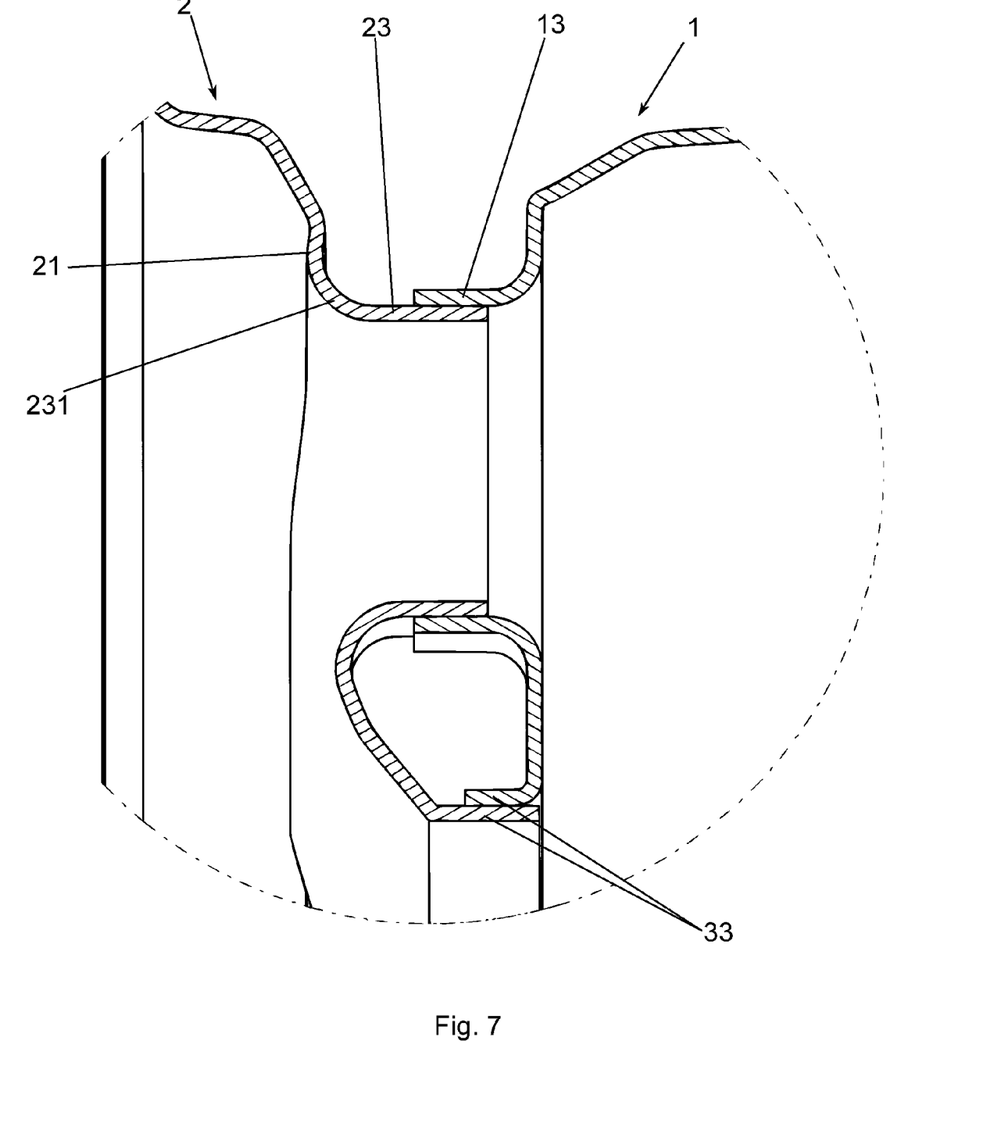
FIG. 7 is an enlarged cross sectional view of the wheel according to the invention.
Figure 8:
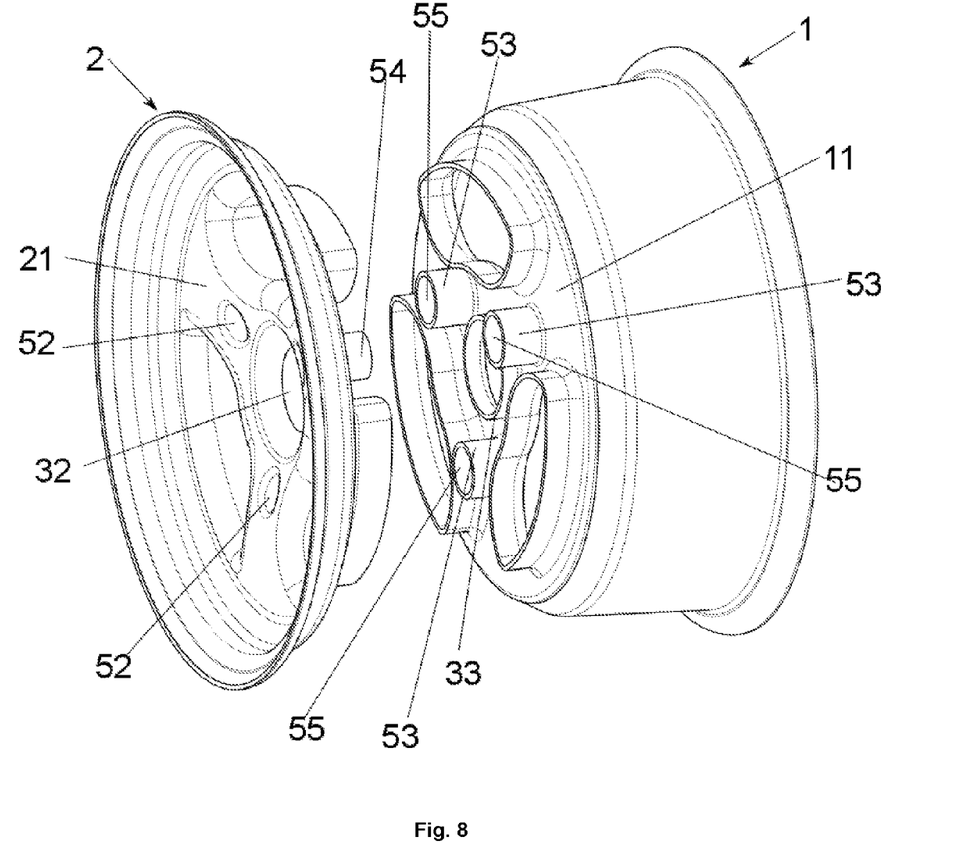
FIG. 8 is perspective view of the inner wheel part and the outer wheel part.

FIG. 7 shows the detail X from FIG. 6. The border (23) of the outer wheel part (2) meshes with the border (13) of the inner wheel part (1). The two-part design of the wheel (6) cannot be recognized from the (outer) visible side because of this design. It becomes clear from the sectional view that the wheel spider (21) passes over the curvature (231) into the border (23) and the wheel spider (21), the curvature area (231) and the border (23) are of a one-part design. It can be recognized in the lower area of the sectional view that the axle openings of the two wheel parts (1, 2) likewise have borders (33), which likewise mesh with one another in a positive-locking manner when the two wheel parts (1, 2) are assembled, even though they differ in terms of height from those of the borders (13, 23) of the other recesses of the wheel spiders (11, 21). It is illustrated, furthermore, that the borders according to this embodiment have walls extending in parallel, i.e., the cross section (the opening) of the borders corresponds to that of the recesses and neither increases nor decreases with increasing distance from the wheel spider. FIG. 8 shows the inner wheel part (1) and the outer wheel part (2) from two different viewing angles. The bolt openings (52) of the outer wheel part (2) comprise borders (54) which mesh with complementary shaped borders (53) of the inner wheel part (2). The bolt holes (55) are used to fasten the wheel to the hub.

While specific embodiments of the invention have been shown and described in detail to illustrate the application of the principles of the invention, it will be understood that the invention may be embodied otherwise without departing from such principles.

The invention claimed is:

1. A wheel comprising:
   an inner wheel part; and
   an outer wheel part, wherein each of said inner wheel part and said outer wheel part has a circumferential wheel flange, a part of a rim well and a part of a wheel spider, wherein recesses of the wheel spider parts of the two wheel parts are surrounded by borders meshing with one another with complementary shape, wherein at least one border of one recess of a wheel spider circumferentially flatly surrounds a border of the other wheel spider or is surrounded by same and the borders touching each other are connected with one another, wherein the inner wheel part has borders around some or all recesses on a side facing away from the vehicle and the outer wheel part has recesses, some or all of which are surrounded on a side facing the vehicle by borders, which correspond to the bordered recesses of the inner wheel part, wherein the borders are designed such that the borders of one wheel part mesh with idea shape with the borders of the other wheel part.

2. A wheel in accordance with claim 1, wherein one recess of each wheel part is an axle opening.

3. A wheel in accordance with claim 2, wherein the axle opening has borders and is surrounded by a back-up ring, which surrounds the borders at equal overall height with complementary shape.

4. A wheel in accordance with claim 1, wherein the borders of the outer wheel part mesh with complementary shape with the borders of the inner wheel part or the borders of the inner wheel part mesh with complementary shape with the borders of the outer wheel part.

5. A wheel in accordance with claim 1, wherein some of the borders of the inner wheel part mesh with complementary shape with the corresponding borders of the outer wheel part and some of the borders of the outer wheel part mesh with complementary shape with the corresponding borders of the inner wheel part.

6. A wheel in accordance with claim 1, wherein the borders of the recesses of the inner wheel part are directed inwardly and the borders of the outer wheel part mesh with complementary shape with the borders of the recesses of the inner wheel part.

7. A wheel in accordance with claim 1, wherein the borders of the recesses of the outer wheel part are directed outwardly and the borders of the inner wheel part mesh with complementary shape with the borders of the recesses of the outer wheel part.

8. A wheel comprising:
an inner wheel part with a radially outward inner wheel flange, an inner rim well portion connected to the inner wheel flange and a centrally positioned inner wheel spider portion connected to the inner rim well portion, the inner wheel spider portion defining a plurality of inner recesses, at least one of the plurality of inner recesses having an axially extending inner recess peripheral border; and
an outer wheel part with a radially outward outer wheel flange, an outer rim well portion connected to the outer wheel flange and a centrally positioned outer wheel spider portion connected to the outer rim well portion, the outer wheel spider portion defining a plurality of outer recesses, at least one of the plurality of outer recesses having an axially extending recess peripheral border, wherein the border of the at least one of the inner recesses has a complementary shape to the border of the at least one of the outer recesses and the border of the at least one of the inner recesses contacts the border of the at least one of the outer recesses.

9. A wheel in accordance with claim 8, wherein at least one of the inner recesses is an axle opening and at least one of the at least one of the outer recesses is an axle opening.

10. A wheel in accordance with claim 9, wherein:
each of the plurality of inner recesses has an axially extending inner recess peripheral border;
each of the plurality of outer recesses has an axially extending recess peripheral border; and
each border of each inner recesses having a complementary shape to a respective border of each outer recesses.

11. A wheel in accordance with claim 10, wherein:
each border of each inner recesses contacting a respective border of each outer recesses with an airtight connection.

12. A wheel in accordance with claim 8, wherein:
each border of each inner recesses contacting a respective border of each outer recesses with an airtight connection.

13. A wheel comprising:
an inner wheel part comprising a radially outward inner wheel flange, an inner rim well portion connected to the inner wheel flange, an inner recess peripheral border and a centrally positioned inner wheel spider portion connected to the inner rim well portion, the inner wheel spider portion defining a plurality of inner recesses, said inner recess peripheral border being arranged adjacent to one of said plurality of inner recesses, said inner recess peripheral border comprising an inner surface extending in an axial direction with respect to a longitudinal axis of said inner wheel part, said inner surface defining an inner recess space, said inner recess space being in communication with said one of said plurality of inner recesses; and
an outer wheel part comprising a radially outward outer wheel flange, an outer rim well portion connected to the outer wheel flange, a recess peripheral border and a centrally positioned outer wheel spider portion connected to the outer rim well portion, the outer wheel spider portion defining a plurality of outer recesses, said recess peripheral border being arranged adjacent to one of said plurality of outer recesses, said recess peripheral border comprising an outer surface extending in said axial direction with respect to said longitudinal axis of said inner wheel part, said outer surface being in direct contact with said inner surface, at least a portion of said outer surface being located in said inner recess space, said recess peripheral border having a complementary shape to the said inner recess peripheral border.

14. A wheel in accordance with claim 13, wherein said inner recess peripheral border is located adjacent to said centrally positioned inner wheel spider portion, said centrally positioned inner wheel spider portion being located between said inner recess peripheral border and said inner rim well portion, said inner rim well portion being arranged between said centrally positioned inner wheel spider portion and said inner wheel flange, said recess peripheral border being located adjacent to said centrally positioned outer wheel spider, said centrally positioned outer wheel spider portion being located between said recess peripheral border and said outer rim well portion, said outer rim well portion being located between said centrally positioned wheel spider portion and said outer wheel flange.

* * * * *